Aug. 12, 1969   O. PÜHRINGER ET AL   3,460,820

CONVERTER ASSEMBLY

Filed Sept. 13, 1966

INVENTORS
OTHMAR PÜHRINGER
ALEXANDER PATUZZI
BY
Their Attorneys

United States Patent Office 3,460,820
Patented Aug. 12, 1969

3,460,820
CONVERTER ASSEMBLY
Othmar Pühringer and Alexander Patuzzi, Linz, Austria, assignors to Vereinigte Osterreichische Eisen- und Stahlwerke Aktiengesellschaft, Linz, Austria, a corporation of Austria
Filed Sept. 13, 1966, Ser. No. 579,029
Claims priority, application Austria, Sept. 14, 1965, A 8,379/65
Int. Cl. C21c 5/42
U.S. Cl. 266—35                                                     4 Claims

ABSTRACT OF THE DISCLOSURE

Thermal stresses on the carrier ring of a converter are reduced by protecting the carrier ring from thermal radiation from the converter body. In one embodiment, the ring is insulated on all surfaces; in a second embodiment, a metal shield is inserted between the ring and the converter body. In both embodiments air is blown between the ring and converter body to further reduce the heat transfer.

---

The carrier rings of metallurgical vessels such as top-blowing converters are not only subjected to mechanical strains, but are also exposed to strong thermal stresses. It has become apparent that hitherto these thermal stresses on the carrier ring have not been adequately taken into account. They have, in fact, been underestimated. In calculating the dimensions of carrier rings for converters, one has generally proceeded from the assumption that by allowing for a static strain of 700 to 800 kg./sq.cm., the thermal strains, too, are sufficiently allowed for. Theoretical reflections made after breakdowns of converter bearings, which have been due to deformations of the carrier ring, have led to the conclusion that the total stress resulting from static and thermal strains must be almost three times as high as the static strain alone. This means that in actual operation the stress on a carrier ring dimensioned in accordance with the previous assumption must be almost at yield point.

As it is essential for the working reliability of a converter bearing to construct the carrier ring very rigid and stable, there are, in principle, two possibilities:

(1) providing an even stronger than hitherto,
(2) protecting the carrier ring from thermal strains.

The first-mentioned possibility, notwithstanding the expenditure, cannot give satisfaction for the reason that the determination of the safety limits still is not free of approximate estimations. Thus, the present invention proposes the adoption of the second-mentioned principle for solving the problem.

As regards the heat-transfer from the converter body to the carrier ring, one has to distinguish between convection and radiation. The amount of heat transferable by convection is limited and is largely carried off by the natural flow of air between the converter shell and the carrier ring. This flow of air between the converter shell and the carrier ring is, however, no suitable means for shielding off the heat radiation from the converter to the carrier ring. On the contrary, this air layer is virtually completely radiation-permeable. Therefore, the inner wall of the carrier ring, which faces the converter, is exposed to radiation from the converter shell. It behaves practically like a black body and almost completely absorbs the amount of heat emanating from the converter body. The thermal stress on the carrier ring is a function of the difference in temperature between the inner side and the outer side of the carrier ring, and this accounts for the great increase in the total stress, which, as mentioned in the introduction, is due to thermal strains.

The present invention thus proposes to reduce or eliminate the temperature differential between the outer side and the inner side of the converter carrier ring by providing a protecting means against heat radiation in the clearance between the converter body and the carrier ring. This arrangement remains effective even if the mean temperature across the cross-sectional area of the carrier ring is increased, as the decrease in the yield point at a temperature increase is by far smaller than the increase in stress caused by a difference in temperature existing between the inner and outer sides of the carrier ring. Thus, a simple embodiment of the invention is achieved by insulating the carrier ring on all sides.

Another possibility is given by arranging a screen in the form of a metal sheet or plate between the converter body and the inner side of the carrier ring, which screen shields the carrier ring against heat radiation, but does not exercise any mechanical functions. With both these embodiments, artificial cooling of the converter shell and of the inner side of the carrier ring by supplying a flow of air is advantageous.

In order that the invention may be more fully understood, an embodiment in accordance therewith will now be described by way of example with reference to the accompanying drawings in which.

Figure 1:
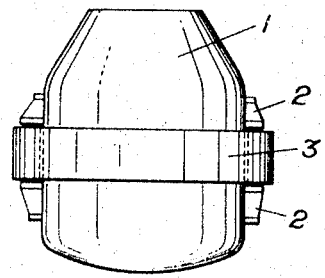
FIG. 1 is an elevation illustrating an oxygen top-blowing converter assembly.
Figure 2:
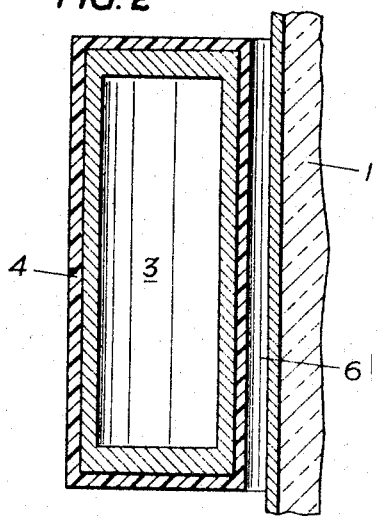
FIG. 2 shows an embodiment of the invention with insulated carrier ring, the carrier ring being shown in a cross-sectional view.
Figure 4:
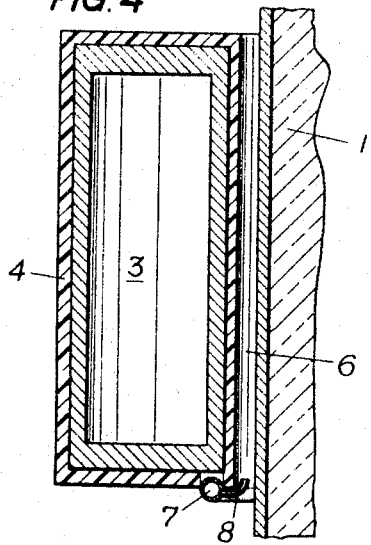
FIGS. 4 and 5 are similar views as FIGS. 2 and 3, with addition of a means for supplying cooling air between the converter shell and the inner side of the carrier ring.

In the figures, numeral 1 denotes the converter body, 2 the so-called claws, by which the converter is supported in the carrier ring. Numeral 3 designates the carrier ring which is shown to be of a box-type design as known per se. The embodiment of the invention as shown in FIGS. 2 and 4 provides an insulation 4 of the carrier ring on all sides. Whereas the mean temperature of the carrier ring is increased by this means, the aim pursued by the invention, which is to reduce or eliminate the temperature differential between the inner and outer sides of the carrier ring, is attained in a satisfactory manner.

Figure 3:
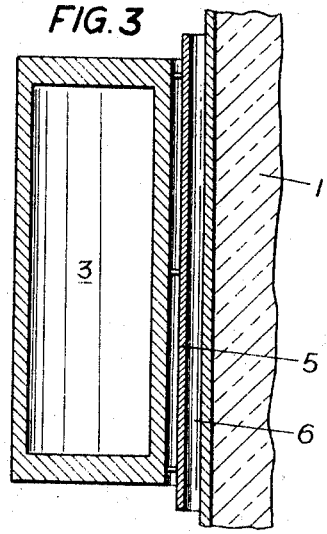
FIG. 3 illustrates another embodiment of the invention, again showing the carrier ring in a cross-sectional view.
Figure 5:
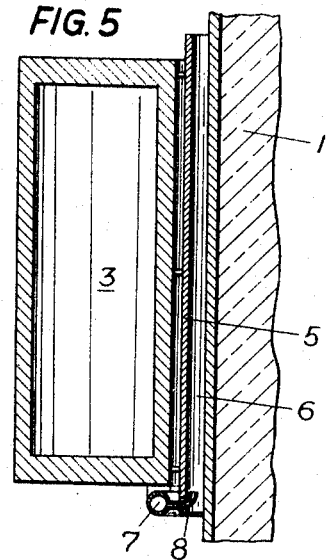

The second embodiment of the invention as shown in FIGS. 3 and 5 provides an intermediate metal sheet or plate 5 as a means against radiation between the converter shell and the carrier ring. As this metal sheet is connected with the carrier ring only at a few points of support, any heat transfer to the carrier ring thereby effected is negligible.

Both embodiments of the invention can be improved by providing for an artificial ventilation of the clearance 6 between the converter body and the carrier ring. To this end, an annular duct 7, which feeds cooling air into the clearance 6 by means of tuyeres 8, is arranged on the carrier ring.

What we claim is:

1. A converter assembly comprising a converter body and a converter ring mounted to surround said converter body with a clearance, means disposed at least in part in said clearance between said converter body and said carrier ring for protecting said carrier ring against heat transfer from said converter body so as to minimize the temperature differential between the inner side and the outer side of the carrier ring, said clearance being sufficient to provide an air passage between said protecting means and said converter body.

2. A converter assembly as set forth in claim 1 wherein said protecting means comprises a radiation-shielding metal sheet arranged in said clearance between said converter body and said carrier ring.

3. A converter assembly as set forth in claim 1 wherein said protecting means comprises thermal insulation on all sides of said carrier ring.

4. A converter assembly as set forth in claim 1 wherein cooling means are provided in said clearance between said converter body and said carrier ring.

References Cited

UNITED STATES PATENTS 3,201,108   8/1965   Kramer _____ 266—36

CHARLES J. MYHRE, Primary Examiner

PO-1050
(5/69)

UNITED STATES PATENT OFFICE
CERTIFICATE OF CORRECTION

Patent No. 3,460,820     Dated Aug. 12, 1969

Inventor(s) Othmar Pühringer and Alexander Patuzzi

It is certified that error appears in the above-identified patent and that said Letters Patent are hereby corrected as shown below:

Col. 1, line 44, "relability" should read --reliabilit line 47, after "stronger" insert --design--.

SIGNED AND
SEALED
MAR 24 1970

(SEAL)
Attest:

Edward M. Fletcher, Jr.
Attesting Officer

WILLIAM E. SCHUYLER, J,
Commissioner of Patent